US007688211B2

(12) United States Patent
Borovoy et al.

(10) Patent No.: US 7,688,211 B2
(45) Date of Patent: Mar. 30, 2010

(54) APPARATUS AND METHOD FOR ENHANCING FACE-TO-FACE COMMUNICATION

(75) Inventors: Richard D. Borovoy, Boston, MA (US); George A. Eberstadt, New York, NY (US)

(73) Assignee: nTAG Interactive Corporation, Boston, MA (US)

( * ) Notice: Subject to any disclaimer, the term of this patent is extended or adjusted under 35 U.S.C. 154(b) by 445 days.

(21) Appl. No.: 10/729,696

(22) Filed: Dec. 5, 2003

(65) Prior Publication Data

US 2004/0189476 A1 Sep. 30, 2004

Related U.S. Application Data

(63) Continuation-in-part of application No. 10/396,064, filed on Mar. 24, 2003.

(51) Int. Cl.

| | |
|---|---|
| ***G08B 23/00*** | (2006.01) |
| ***G08B 13/14*** | (2006.01) |
| ***G08B 29/00*** | (2006.01) |
| ***H04Q 7/20*** | (2006.01) |
| ***G06F 15/16*** | (2006.01) |
| ***G09G 5/00*** | (2006.01) |

(52) U.S. Cl. ................. 340/573.1; 340/572.1; 340/505; 455/517; 455/456.2; 455/456.3; 709/217; 709/218; 709/219; 709/204; 345/156

(58) Field of Classification Search ....................... None
See application file for complete search history.

(56) References Cited

U.S. PATENT DOCUMENTS

| | | | |
|---|---|---|---|
| 4,173,016 | A | 10/1979 | Dickson |
| 4,654,793 | A | 3/1987 | Elrod |
| 4,739,328 | A | 4/1988 | Koelle et al. |
| 4,782,345 | A | 11/1988 | Landt |

(Continued)

FOREIGN PATENT DOCUMENTS

| | | |
|---|---|---|
| WO | WO 97/24627 | 7/1997 |

(Continued)

OTHER PUBLICATIONS

Borovoy, et al. (1996), Things that Blink: Computationally Augmented Name Tags [Electronic version]. *IBM Systems Journal*, vol. 35, No. 3&4, 9 pages.

(Continued)

*Primary Examiner*—Julie Lieu
(74) *Attorney, Agent, or Firm*—Fish & Richardson P.C.

(57) ABSTRACT

A wearable electronic tag for displaying graphics and text images and for communicating with other similar tags. Each tag includes a visible, graphical display adapted to be worn by a user. The tag also includes a short range, substantially unidirectional electronic communication channel, such as an infrared transmitter-receiver, located on the display unit so that, when the display unit is worn, the interface faces in a direction of the desired communication with another person who also is wearing a similar tag. This arrangement makes possible automatic data exchange and comparison of the interchanged data and display of the results of the comparison on the tags worn by the two wearers. The tags also have a longer range wireless communication system to receive and transmit data.

9 Claims, 1 Drawing Sheet

U.S. PATENT DOCUMENTS

| | | | | |
|---|---|---|---|---|
| 4,786,907 | A | 11/1988 | Koelle | |
| 4,816,839 | A | 3/1989 | Landt | |
| 4,835,377 | A | 5/1989 | Brown | |
| 4,853,705 | A | 8/1989 | Landt | |
| 4,893,118 | A | 1/1990 | Lewiner et al. | |
| 5,055,659 | A | 10/1991 | Hendrick et al. | |
| 5,086,394 | A | 2/1992 | Shapira | |
| 5,189,408 | A | 2/1993 | Teicher | |
| 5,413,710 | A | 5/1995 | Roberts et al. | |
| 5,909,183 | A | 6/1999 | Borgstahl et al. | |
| 5,936,542 | A | 8/1999 | Kleinrock et al. | |
| 5,952,922 | A | 9/1999 | Shober | |
| 5,978,495 | A | 11/1999 | Thomopoulos et al. | |
| 6,009,333 | A | 12/1999 | Chaco | |
| 6,070,147 | A | 5/2000 | Harms et al. | |
| 6,148,192 | A | 11/2000 | Ahvenainen | |
| 6,188,916 | B1 | 2/2001 | Noda et al. | |
| 6,211,860 | B1 | 4/2001 | Bunsen | |
| 6,222,914 | B1 | 4/2001 | McMullin | |
| 6,347,301 | B1 | 2/2002 | Bearden, III et al. | |
| 6,424,843 | B1 | 7/2002 | Reitmaa et al. | |
| 6,567,101 | B1 | 5/2003 | Thomas | |
| 6,618,005 | B2 | 9/2003 | Hannah et al. | |
| 6,657,543 | B1 | 12/2003 | Chung | |
| 6,711,414 | B1 * | 3/2004 | Lightman et al. | 455/517 |
| 6,753,899 | B2 | 6/2004 | Lapalme et al. | |
| 6,757,719 | B1 | 6/2004 | Lightman et al. | 709/219 |
| 6,819,220 | B1 | 11/2004 | Lee et al. | |
| 6,834,195 | B2 | 12/2004 | Brandenberg et al. | |
| 6,842,121 | B1 | 1/2005 | Tuttle | |
| 6,847,969 | B1 | 1/2005 | Mathai et al. | |
| 6,879,960 | B2 | 4/2005 | Nascenzi et al. | |
| 6,933,923 | B2 | 8/2005 | Feinstein | |
| 6,937,154 | B2 | 8/2005 | Zeps et al. | |
| 6,947,772 | B2 | 9/2005 | Minear et al. | |
| 6,982,728 | B1 | 1/2006 | Nicolas et al. | |
| 7,016,704 | B2 | 3/2006 | Pallakoff | |
| 7,046,779 | B2 | 5/2006 | Hesse | |
| 7,080,057 | B2 | 7/2006 | Scarborough et al. | |
| 7,092,821 | B2 | 8/2006 | Mizrahi et al. | |
| 7,108,173 | B1 | 9/2006 | Wang et al. | |
| 7,240,022 | B1 | 7/2007 | Bistriceanu et al. | |
| 7,343,313 | B2 | 3/2008 | Dorenbosch et al. | |
| 7,447,176 | B2 | 11/2008 | Ruan et al. | |
| 2002/0161779 | A1 | 10/2002 | Brierley et al. | |
| 2002/0165731 | A1 | 11/2002 | Dempsey | |
| 2002/0165919 | A1 | 11/2002 | Pietila | |
| 2002/0180762 | A1 | 12/2002 | Lee | |
| 2003/0005160 | A1 | 1/2003 | Schaefer | |
| 2003/0038778 | A1 | 2/2003 | Noguera | |
| 2003/0058826 | A1 | 3/2003 | Shearer | |
| 2003/0112217 | A1 | 6/2003 | Lee | |
| 2003/0193399 | A1 | 10/2003 | Hum et al. | |
| 2003/0227386 | A1 | 12/2003 | Pulkkinen et al. | |
| 2004/0034723 | A1 | 2/2004 | Giroti | |
| 2004/0077367 | A1 | 4/2004 | Sama et al. | |
| 2004/0095276 | A1 | 5/2004 | Krumm et al. | |
| 2004/0111360 | A1 | 6/2004 | Albanese | |
| 2004/0157648 | A1 | 8/2004 | Lightman | 455/566 |
| 2004/0189476 | A1 | 9/2004 | Borovoy et al. | |
| 2004/0201479 | A1 | 10/2004 | Garber et al. | |
| 2005/0034079 | A1 | 2/2005 | Gunasekar et al. | |
| 2005/0174302 | A1 | 8/2005 | Ishii | |
| 2006/0025207 | A1 | 2/2006 | Walker et al. | |
| 2006/0029296 | A1 | 2/2006 | King et al. | |
| 2006/0044112 | A1 | 3/2006 | Bridgelall | |
| 2009/0102645 | A1 | 4/2009 | Borovoy | |

FOREIGN PATENT DOCUMENTS

| | | |
|---|---|---|
| WO | WO 2004/086288 | 10/2004 |
| WO | WO 2006/093815 | 9/2006 |
| WO | WO 2007/100977 | 9/2007 |
| WO | WO 2007/115037 | 10/2007 |

OTHER PUBLICATIONS

Borovoy, et al. (1998), GroupWear: Nametags that Tell about Relationships [Electronic version]. *MIT Media Laboratory*, vol. 98, pp. 329-330.

Borovoy, et al. (1998), Meme Tags and Community Mirrors: Moving from Conferences to Collaboration [Electronic version]. *Proceedings of the 1998 ACM Conference on Computer Supported Cooperative Work*, 10 pages.

Borovoy, et al. (1999), Revealing Common Ground: Augmentation on the Edges of Interpretive Communities [Electronic version]. *Proceedings of the Computer Support for Collaborative Learning (CSCL) 1999 Conference*, 11 pages.

Salemi, Michael K. Teaching methods and incentives: a briefing paper for participants in the research projects conference. AEA Committee on Economic Education, May 2000.

Borovoy, Richard Daniel, "Folk Computing: Designing Technology to Support Face-to-Face Community Building," Doctor of Philosophy in Media Arts and Science at the Massachusetts Institute of Technology (2002).

nTAG website[online], [retrieved on Mar. 26, 2008] Retrieved from the Internet:<URL:http://web.archive.org/web/20010723211522/http://www.ntag.com/>.

nTAG website[online], [retrieved on Mar. 26, 2008] Retrieved from the Internet:<URL:http://web.archive.org/web/20010929214534/http://www.ntag.com/>.

nTAG website[online], [retrieved on Mar. 26, 2008] Retrieved from the Internet:<URL:http://web.archive.org/web/20021120062133/http://ntag.com/>.

nTAG website[online], [retrieved on Mar. 26, 2008] Retrieved from the Internet:<URL:http://web.archive.org/web/20021206235526/http://ntag.com/>.

nTAG website[online], [retrieved on Mar. 25, 2008] Retrieved from the Internet:<URL:http://web.archive.org/web/20030123072248/http://ntag.com/>.

nTAG website[online], [retrieved on Mar. 25, 2008] Retrieved from the Internet:<URL:http://web.archive.org/web/20030324095045/http://ntag.com/>.

nTAG website[online], [retrieved on Mar. 25, 2008] Retrieved from the Internet:<URL:http://web.archive.org/web/20030423223516/http://ntag.com/>.

nTAG website[online], [retrieved on Mar. 25, 2008] Retrieved from the Internet:<URL:http://web.archive.org/web/20030610105428/http://www.ntag.com/>.

nTAG website[online], [retrieved on Mar. 25, 2008] Retrieved from the Internet:<URL:http://web.archive.org/web/20030622225609/http://ntag.com/>.

nTAG website[online], [retrieved on Mar. 25, 2008] Retrieved from the Internet:<URL:http://web.archive.org/web/20030803122357/http://ntag.com/>.

nTAG website[online], [retrieved on Mar. 25, 2008] Retrieved from the Internet:<URL:http://web.archive.org/web/20030804092519/http://www.ntag.com/>.

nTAG website[online], [retrieved on Mar. 25, 2008] Retrieved from the Internet:<URL:http://web.archive.org/web/20030923155214/http://ntag.com/>.

nTAG website[online], [retrieved on Mar. 25, 2008] Retrieved from the Internet:<URL:http://web.archive.org/web/20031004233331/http://www.ntag.com/>.

nTAG website[online], [retrieved on Mar. 25, 2008] Retrieved from the Internet:<URL:http://web.archive.org/web/20031007104835/http://www.ntag.com/>.

nTAG website[online], [retrieved on Mar. 25, 2008] Retrieved from the Internet:<URL:http://web.archive.org/web/20031014022339/http://www.ntag.com/>.

nTAG website[online], [retrieved on Mar. 25, 2008] Retrieved from the Internet:<URL:http://web.archive.org/web/20031018163154/http://ntag.com/>.

nTAG website[online], [retrieved on Mar. 25, 2008] Retrieved from the Internet:<URL:http://web.archive.org/web/20031019132348/http://ntag.com/>.
nTAG website[online], [retrieved on Mar. 25, 2008] Retrieved from the Internet:<URL:http://web.archive.org/web/20031128062003/http://ntag.com/>.
nTAG website[online], [retrieved on Mar. 25, 2008] Retrieved from the Internet:<URL:http://web.archive.org/web/20031201232035/http://www.ntag.com/>.
nTAG website[online], [retrieved on Mar. 25, 2008] Retrieved from the Internet:<URL:http://web.archive.org/web/20031219150346/http://ntag.com/>.
nTAG website[online], [retrieved on Mar. 25, 2008] Retrieved from the Internet:<URL:http://web.archive.org/web/20031229072255/http://ntag.com/>.
nTAG website[online], [retrieved on Mar. 25, 2008] Retrieved from the Internet:<URL:http://web.archive.org/web/20031231113924/http://www.ntag.com/>.
nTAG website[online], [retrieved on Mar. 26, 2008] Retrieved from the Internet:<URL:http://web.archive.org/web/20040101051640/http://www.ntag.com/>.
nTAG website[online], [retrieved on Mar. 26, 2008] Retrieved from the Internet:<URL:http://web.archive.org/web/20040122055255/http://ntag.com/>.
nTAG marketing brochure, "nTAG: The complete on-site event communication system," (Mar. 2005).
nTAG marketing brochure, "Event Services Applications," (May 2005).
nTAG marketing brochure, "Networking Applications," (May 2005).
nTAG marketing brochure, "Networking Applications," (Jun. 2005).
U.S. Appl. No. 10/396,064, Borovoy, et al., filed Mar. 24, 2003; Copies of Application; Pending Claims; and Transaction History.
U.S. Appl. No. 11/069,716, Borovoy, et al., filed Feb. 28, 2005; Copies of Application; Pending Claims; and Transaction History.
U.S. Appl. No. 11/359,878, Borovoy, et al., filed Feb. 22, 2006; Copies of Application; Pending Claims; and Transaction History.
U.S. Appl. No. 11/397,032, Borovoy, et al., filed Mar. 31, 2006; Copies of Application; Pending Claims; and Transaction History.
U.S. Appl. No. 11/975,948, Borovoy, et al., filed Oct. 23, 2007; Copies of Application; Pending Claims; and Transaction History.
International Search Report, Patent Cooperation Treaty, Apr. 3, 2007, 11 pages.
International Search Report, Patent Cooperation Treaty, Dec. 2, 2005, 11 pages.
Cox, et al. "IntelliBadge", Towards Providing Location-Aware Value Added Services at Academic Conferences UbiComp (2003) Ubiquitous Computing (2003).
Cox, et al. "Intellibadge", In Proc. Of 1st Internatinal Workship on Ubiquitous Systems for Supporting Social Interaction and Face-to-Face Communication in Public Spaces, Annual Conference on Ubiquitous Computing (2003).
Laibowitz, et al. "The Uber-Badge-A Versatile Platform at the Juncture Between Wearable and Social Computing", The 2nd International Conference on Pervasive Computing (2004).
Lewis, Diane E., "Breaking the Ice 2.0—Forget the Bland Name Sticker: The Interactive nTag is Giving Strangers Something to Talk About as They Network at Social Events", The Boston Globe, Nov. 2004.
McCarthy, et al. "Proactive Displays & The Experience UbiComp Project", Adjunct Proceedings of Ubicomp (2003).
Metz, "The Social Network Tag" PCMag.com, Feb. 27, 2004.
http://www.ntag.com (2003).
Handout distributed at Staubach company meeting, held Oct. 2004.
"First Interactive Name Bade Introduced by nTAG," published May 2, 2003, on www.eibtm.org.
"High-Tech Name Badge Earns EIBTM Distinction" published May 23, 2003, on meetingsnet.com, (as obtained from web.archive.org/web/20030528054503/http://meetingsnet.com).
nTAG, Interactive namebadge, published Apr. 23, 2003, on meetingsnet.com/news/meetings_hightech_name_badge.
"First Interactive Name Badge Introduced By nTAG ; Gatherings and Meetings Take Quantum Leap in Conversation and Connections" Business Wire, Apr. 23, 2003.
Borovoy, et al., "Folk Computing: Revisiting oral tradition as a scaffold for co-present communities" Proceedings of the SIGCHI conference on Human factors in computing systems, Seattle, Washington, United States, pp. 466-473 (2001).
IrDA® Data Compliant 115.2 kb/s 3 V to 5 V Infrared Transceiver Model Nos. HSDL-3610#007 and HSDL-3610#008 by Agilent Technologies, 28 pages.
Reynolds et al., "WHITE-PAPER—Multiband, Low-Cost EPC Tag Reader," published on Jun. 1, 2002, by the Auto-ID Center, Massachusetts Institute of Technology, 77 Massachusetts Avenue, Building 3-449, Cambridge, MA 02139-4307, 26 pages.
Sharp specification sheet entitled "GP1S36 Photointerrupter for Detecting Tilt Direction," 5 pages.
PAIR Transaction History for U.S. Appl. No. 11/975,948, filed on Oct. 23, 2007.
PAIR Transaction History for U.S. Appl. No. 10/396,064, filed on Mar. 24, 2003.
PAIR Transaction History for U.S. Appl. No. 11/069,716, filed on Feb. 28, 2005.
PAIR Transaction History for U.S. Appl. No. 11/397,032, filed on Mar. 31, 2006.
PAIR Transaction History for U.S. Appl. No. 11/359,878, filed on Feb. 22, 2006.
PAIR Transaction History for U.S. Appl. No. 11/975,948, filed on Oct. 23, 2007.
PAIR Transaction History for U.S. Appl. No. 10/396,064, filed on Mar. 24, 2003.
PAIR Transaction History for U.S. Appl. No. 11/069,716, filed on Feb. 28, 2005.
PAIR Transaction History for U.S. Appl. No. 11/397,032, filed on Mar. 31, 2006.
PAIR Transaction History for U.S. Appl. No. 11/359,878, filed on Feb. 22, 2006.
PAIR Transaction History for U.S. Appl. No. 11/975,948, filed on Oct. 23, 2007.
PAIR Transaction History for U.S. Appl. No. 10/396,064, filed on Mar. 24, 2003.
PAIR Transaction History for U.S. Appl. No. 11/069,716, filed on Feb. 28, 2005.
PAIR Transaction History for U.S. Appl. No. 11/397,032, filed on Mar. 31, 2006.
PAIR Transaction History for U.S. Appl. No. 11/359,878, filed on Feb. 22, 2006.
International Search Report, Patent Cooperation Treaty, Jan. 18, 2008, 13 Pages.
International Search Report, Patent Cooperation Treaty, Mar. 10, 2008, 9 Pages.
U.S. Appl. No. 11/975,948, filed Oct. 23, 2007; PAIR Transaction History.
U.S. Appl. No. 10/396,064, filed Mar. 24, 2003; PAIR Transaction History.
U.S. Appl. No. 11/069,716, filed Feb. 28, 2005; PAIR Transaction History.
U.S. Appl. No. 11/397,032, filed Mar. 31, 2006; PAIR Transaction History.
U.S. Appl. No. 11/359,878, filed Feb. 22, 2006; PAIR Transaction History.
PAIR Transaction History for U.S. Appl. No. 11/975,948, filed on Oct. 23, 2007.
PAIR Transaction History for U.S. Appl. No. 10/396,064, filed on Mar. 24, 2003.
PAIR Transaction History for U.S. Appl. No. 11/069,716, filed on Feb. 28, 2005.
PAIR Transaction History for U.S. Appl. No. 11/397,032, filed on Mar. 31, 2006.
PAIR Transaction History for U.S. Appl. No. 11/359,878, filed on Feb. 22, 2006.

* cited by examiner

APPARATUS AND METHOD FOR ENHANCING FACE-TO-FACE COMMUNICATION

CROSS-REFERENCE

This application is a continuation-in-part of application Ser. No. 10/396,064, filed Mar. 24, 2003.

BACKGROUND

This invention relates to a method and apparatus for facilitating face-to-face communication. More specifically, the invention relates to a wearable display that has communication capability, allowing the wearers' displays to communicate with each other, either with or without any action by the wearer.

Over the past several years, technology has been developed at the Media Laboratory of the Massachusetts Institute of Technology to facilitate face-to-face communication. One of the inventors of this invention has done pioneering work in the development of "intelligent badges" worn by meeting participants to take the place of paper badges. Early incarnations of this technology used badges that contained multiple LEDs that communicated with each other. The signals transmitted between the badges denoted the answers to preprogrammed, multiple-choice questions. By watching the number of LEDs that lighted up when two people wearing these badges came close to each other, you could ascertain the number of multiple-choice questions that the two people answered with the same choice. For example, if there were five LEDs on the badge, and three lighted up when the two people approached each other, they both knew that they had answered three questions with the same choice.

This technology was later expanded by included coded ideas. Data could be entered into the badges expressing an idea. An idea was displayed in text on a wearer's badge. When two wearers approached each other, if one agreed with the idea of the other (he could read the idea on the other person's badge), he could press a button on his own badge and that idea would be "accepted." Since the acceptance was memorized, data could be gathered at the meeting about which ideas received wider and which received lesser levels of acceptance among the participants.

SUMMARY

Briefly, the apparatus of this invention relates to a wearable electronic display unit for displaying graphics and text images and for communicating with other similar wearable displays. The display unit, for the purposes of easy reference and not by way of limitation, will hereinafter be referred to as a "tag." Each tag includes a visible, graphical display adapted to be worn by a user and capable of displaying text and graphical images. The tag may be worn around the wearer's neck, for example, on a lanyard, or clipped to the person's belt or clothes. A preferred embodiment of the tag is about four inches square and less than an inch deep, except for the battery. The battery may add an extra quarter of an inch to the depth. The tag weighs about 6 ounces.

The tag also includes a short range, substantially unidirectional electronic communication channel, such as an infrared transmitter-receiver, as is well known in the art, having a data transmitting and receiving interface incorporated into the display unit. This interface is located on the display unit so that, when the display unit is worn by its wearer, the interface and the display face in a direction of the desired substantially unidirectional communication, so as to make electronic communication between tags. In this configuration, the two tags can exchange data, and each tag wearer can view the display of the tag worn by the other tag wearer. This arrangement makes possible data exchange between respective tags worn by two wearers through the interfaces on the respective tags.

In a preferred embodiment of the invention, the tag may have two electronic means of communication, one short range, such as infrared, and one longer range, such as radio frequency identification communication ("RFID"), well known in the art and long been used to electronically pay tolls at a toll gate. RFID is a medium range communication channel, for example, less than 20 feet. Alternatively, the longer range communication could be WiFi (IEEE 802.11 and its successors), or other radio communication systems. In one embodiment of the invention, the tags can include a GPS receiver so that the precise location of the wearer can be ascertained. Any or all of these communication, location or identification systems can be advantageously combined for the purposes of this invention.

In addition to the tags being capable of communicating with each other, they also may communicate with other things, such as a signboard, permitting the signboard to personalize its message based upon information transmitted to it by a tag. An additional desirable feature of a tag of the invention is a timer so that the actual, or relative time of various communications or actions by the wearer (such as entering a room or encountering another tag wearer) can be kept track of and used for various of the methods of this invention.

The tags each have a microprocessor and a memory. Data can be entered into the memory in several ways. For example, the tag will have at least a minimum number of keys or buttons, such as "scroll up," "scroll down," and "select." The tags may also have a scroll wheel, such as a clickable scroll where (where a choice is indicated by depressing the scroll wheel), just as PDAs do, to scroll up and down through menus or text. If desired, a complete keyboard can be included. This facilitates manual data entry. In addition, data can be transmitted to the tags from an RFID reader or any other radio system. When a wearer passes such a reader, data can be placed into the tag. Data can also be "broadcast," for example to an entire room, using RFID transmission and downloading the data into all tags in range, or by using appropriate coding, just to selected tags. Finally, the tags may have a wired port, such as a serial port, where data can be downloaded from a computer, such as a personal computer ("PC").

The display of the tag, such as an LCD display, may be backlit, and may include a backlight turn-off timer to save battery power. The tag may also include additional visible indicia, such as a light or a flashing light. Alternatively, or in addition, the tag may emit a sound or a beep to signal the wearer. Preferably, the light is located in a place on the tag where the wearer can normally see it.

In addition, the display may be adapted to be viewed both by the wearer in one mode, and by a person who is nearby in another mode. For example, the tag can hang around the neck of the wearer, and the text will be viewable by a passersby. However, when the wearer lifts the tag up to read it, the text inverts so that it easily may be viewed by the wearer. Furthermore, when the wearer is reading the tag at close range, the text may become smaller to allow more text on the display. However, when the tag is being viewed by another person, the text may enlarge so that it may be read from farther away. In order to change modes automatically, the tag includes a sensor that detects whether the tag is oriented in one vertical direction, or in the opposite vertical direction. Such tilt sensors are well known in the art.

The invention also includes a method of communicating face-to-face using a tag of the invention. This method of communication takes place by passing a first packet of information electronically from the tag of a first wearer to the tag of a second wearer, the information including personal information about the first wearer. Then text information is displayed on the tag of the second wearer that is based upon a comparison between the first packet of information passed by the first wearer, and a second packet of information contained within the tag of the second wearer. The second packet of information includes personal information about the second wearer. Then text information is displayed on the tag of the second wearer and is visible to the first wearer. The displayed text information includes information that resulted from the comparison of the two packets of information.

Then one or both of the two people can take various actions based upon what they have seen on the other person's tag, all as will be described in the complete description of the preferred embodiment and drawings, which follow.

DETAILED DESCRIPTION

Figure 1:
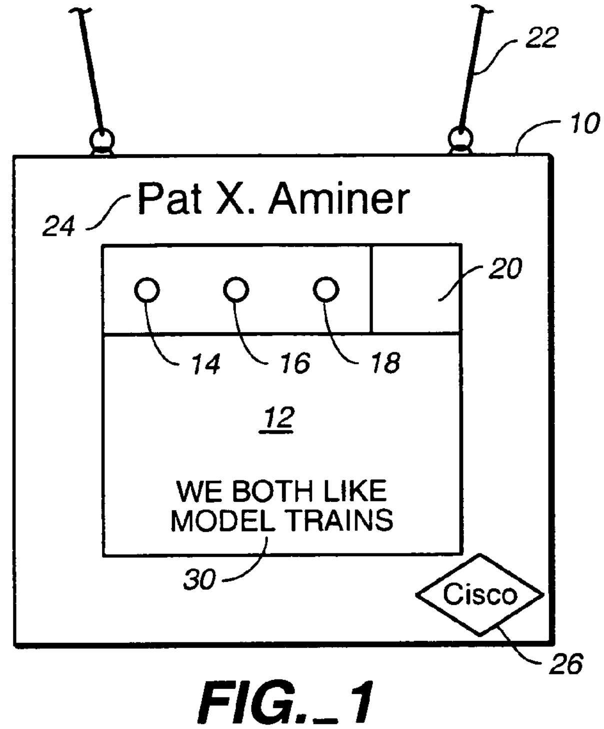
FIG. 1 is a front view of the display unit of this invention.
Figure 2:
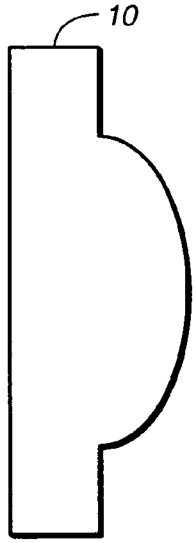
FIG. 2 is a top view of the display unit of the invention.

The tag of this invention is shown in FIGS. 1-4. Referring to the figures, tag 10 has its electronics all inside the module. It is manufactured in a similar manner to a personal digital assistant of the type marketed by Palm and many other companies. The unit includes a microprocessor, memory, such as flash memory, or other types of faster memory, all as well known in the art, and depending upon the application and various interface electronics and communication devices, including RFID and infrared (these are inside the unit and are not shown in the drawings). These are interconnected, as is know in the art, on a printed circuit board.

The unit is adapted to hang around the wearer's neck using lanyard 22, although it can have a clip or other attachment mechanism on the back (not shown) to attach it to the wearer's clothing. The lanyard is preferably an adjustable length lanyard so that the shorter length allows the tag to hang high on the wearers chest in the tag mode, when it is to be read by someone else, but uses the longer length needed when the tag is to be raised for reading by the wearer. When the tag is to be read by someone other than the wearer, it is in the "tag mode."

It is important for this invention that the display 12 on tag 10 and the communication interface 20 both face outwardly so that communication is possible with another tag wearer standing face-to-face with the first wearer. In that way, each wearer can see display 12 of the other wearer, and the communication interface 20 is facing a similar communication interface on the tag 10 of the other wearer.

If desired, the tag may have a sticker, preferably a removable sticker, affixed to the front. That sticker may have printed on it the wearer's name 24 and the wearer's affiliation shown in logo 26. Alternatively, the wearer's affiliation can be printed below the wearer's name on the top, and the logo 26 can be the logo of the host of the conference, for example. This sticker is important in case a tag is mislaid. These stickers are removable and can be personalized, as these tags are used over and over again for different wearers.

When two people wearing these tags 10 are standing face-to-face, their respective communications interfaces 20, which can be, for example, an infrared transmitter-receiver, communicate with each other. In a preferred embodiment, the IR transmitter-receiver is tuned to begin information exchanges at a range of about three feet. Infrared transmitter-receivers are well known in the art. One example, as shown in Appendix A, is the IrDA Data Compliant 115.2 kb/s 3V to 5V Infrared Transceiver Model Nos. HSDL-3610#007 and HSDL-3610#008 made by Agilent Technologies. In that way, data contained in the memory of each unit can be passed to the other unit. A receiving unit can process a received packet of information, combine it with a packet of information contained within the receiving unit, and then display the results of that combination on the receiving unit. Alternatively, the tags may communicate with each other by other means, such as radio, for example, using the Bluetooth standard. Many examples of this will be explained below.

Not shown in the drawings, but contained in tag 10, is an RFID communication system, as is well known in the art. RFID is a backscatter system. Base stations called "readers" generate a strong RF signal. The tags remodulate the signal and use the energy of the transmitted signal to send back information to the reader. This minimizes the power requirements for the tags. Almost no energy from the tag is required for the remodulation and retransmission. The tags of the invention can be powered for five days with four AAA batteries. If desired, rechargeable batteries also can be used.

RFID is a very robust communication, medium range communication system, able to withstand many types of interference that would harm other types of radio transmissions. Such interference is generated by cell phones, wireless microphones, walkie-talkies, remote landline phones, and/or wireless networks. RFID systems allow large numbers of users to roam about large areas without any reprogramming required.

Within the tag 10 is an antenna and encoding system (not shown), as are well known in the art, so that information is transmitted from an RIFD reader, within reading proximity of the tag, to the tag's memory. Similarly, data from the memory of a tag passing within range of a reader will be transmitted to the reader, for example, for further transfer to a computer for collation with data received from other tags. An example of such an RFID system is described in an article entitled "WHITE PAPER—Multiband, Low-Cost EPC Tag Reader," by Matthew Reynolds, et al., published on Jun. 1, 2002, by the Auto-ID Center, Massachusetts Institute of Technology, 77 Massachusetts Avenue, Building 3-449, Cambridge, Mass. 02139-4307. See Appendix B. Other RFID systems, including readers and transponders of the type that are incorporated in the tags of this invention are described in U.S. Pat. Nos. 5,055,659, 4,739,328, 4,782,345, 4,786,907, 4,816,839, 4,835,377, and 4,853,705—all of which are incorporated by reference.

Of course other radio communication systems can be employed instead of or in addition to RFID. For example, the tag radio may act as a relay station, relaying messages from one tag to another, or from a tag to a central transmitter-receiver. The base transmitter-receivers are located around the meeting venue or convention hall to provide the relay function. In this embodiment, an individual tag communicates primarily with the base units. However, tag-to-tag radio communication for data exchange can still be employed using the same relay technique, and can be used for the detection of the proximity of one tag to another.

There are a variety of ways to enter and retrieve data into and from a tag. In most conferences, attendees preregister, usually on the worldwide web. This data is collected by the conference planners and can be collated and downloaded into each participant's tag. For this purpose, a tag may have a port, such as a serial port, through which data may be downloaded. This interface is well known, and is used, for example, to synchronize a PDA to a PC. When the conference is over, data may be uploaded from the tag to a computer using the same port.

In addition, data may be entered or retrieved from a tag using an RFID reader. When a tag passes in range of such a reader, the reader, as is well known in the art, can download or upload data to or from a tag.

Of course the tag itself can be used for obtaining and transmitting data. The infrared channel built into the tag transmits data to other tags, receives data from other tags, and can be used also to transmit data to a PC, either directly to an infrared transmitter/receiver on the PC (as commonly come with laptop computers) or using an extra tag intervening between the tag to be read or provided with data, and the PC. In this application, the extra tag can, for example, be attached to the PC through its serial port. This tag-to-tag method using RF has an advantage over using RFID for loading or unloading large amounts of data, as IR normally has wider bandwidth than RFID.

And finally, a wearer can enter data into his own tag by using the buttons 14, 16, and 18. For example, button 14 can be used as a scroll down button, button 16 as a scroll up button and button 18 as a select button. In that manner, the user can select choices from lists downloaded earlier into a tag, or answer multiple-choice questions. Alternatively, if desired, voice recognition can be installed in a tag so the user can enter data by speaking into the tag. The sensitivity of microphone that receives the voice commands may be changed, depending on whether the tag is in the "menu mode" (where only the wearer's voice is to be heard), or when the device is in the "tag mode" where the voice would come from a few feet away.

There is a growing use of the World Wide Web to create multi-user social network databases. For example, a website such as "Friendster" allows users to enter their profiles into the network, as well as entering the names of all the people they know. Then a user of Friendster can look, for example, for a particular person that she would like to meet, such as the movie star Tom Hanks. If someone that she has listed as a friend has listed Tom Hanks as a friend, the network will pop up with that person's name. Then the user need only call or email her friend that knows Tom Hanks, and ask for an introduction. If none of her friends happen to know Mr. Hanks, the network will search a level deeper to see if any friends of those she listed as her friends happen to know (have listed) Mr. Hanks as a friend. If so, the website will provide the name of both the friend (the first order contact) and the friend of the friend (the second order contact) to the user. Through those two people, perhaps an introduction can be arranged.

The tag of the invention can be very useful in connection with such a social network database. The tags keep track of people with whom a wearer has come in contact, as described above. This information can then be downloaded into the social network database. Therefore a person's social network will contain not only historical relationship data that the person has entered into the network, but real time data about people a wearer has recently met face-to-face, that can be uploaded, according to the invention, from the tag to the social network database using the techniques described herein.

Additionally, social network data can be downloaded into the tags. Then, when a wearer meets someone face-to-face who also has his social network in the tag, the two people can immediately find out to what extent their social networks overlap. Each tag can display a list of any or all people that the two people who are meeting know in common. This is similar to the real world social game people play when they meet new people. They spend a good part of their initial conversation time trying to find out who they may know in common. Using the tags and the social network, the game can be speeded up immensely, enabling the conversation to be focused on the people the two wearers know in common, rather than spending the time and effort first to find out who these people are. The tags perform that function in conjunction with each person's social database contained in their respective tags. This function may also be performed by using the tag's radio to query the social network database running on a remote server in real time, rather than having the data stored on the tags themselves.

Additionally, if a person wearing a tag wants to meet someone who is attending the meeting, the social network may be employed so that, if a person meets someone who also knows the person who is being sought (and perhaps may have spotted that person), it becomes easier for a person to find that person. The tags can draw on the social network data to suggest introductions.

If a person going to a meeting wants to do so, she can access an online tool in advance and use her social network, together with a list of meeting attendees, to find out what friends of her friends may be present at the meeting. This information can be downloaded into her tag she is going to wear. Alternatively, the social network database can be queried in real time during the meeting, using either radio or the RFID readers described herein. The tags can then be used at the meeting, as described herein, to locate those friends of her friends.

After an event, or even during the event, the tag wearer can download from his tag the contacts made at the event into his social network as described herein.

Kiosks located at central or entrance points at an event can be used to download or upload data into and out of the tags. The kiosk can have a PC with an attached tag, so the wearer of a tag can approach the attached tag (or "dip" his tag into a bucket containing the attached tag) and receive or transmit data. Alternatively, the kiosk can have an RFID reader and the tag can get or send data that way. There are also a number of beaming systems becoming available which provide self-contained beaming sources connected to a central server, either wired or wireless. These may be used to get data into the tag. Another method of getting data into a tag is from a PDA, beamed directly to the tag. The PDA can get data when it is synched to a PC, or otherwise. The user enters data onto his/her palm and from there beams it in to his/her tag.

Figure 3:
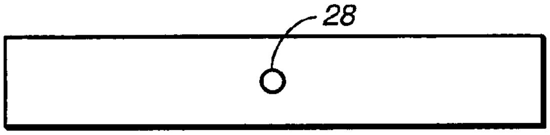
FIG. 3 is a side view of the display unit of this invention.

Another feature of the invention is shown in FIG. 3. Light 28, on top of the unit, can light up when the tag wants to get the attention of its wearer. Alternatively, a buzzer or beeper can be used (not shown), either audible or vibrating, for the same purpose. If desired, the lanyard which holds the tag around the wearer's neck can be the source of the vibration to alert the wearer. Applications of these features will be described below.

Figure 4:
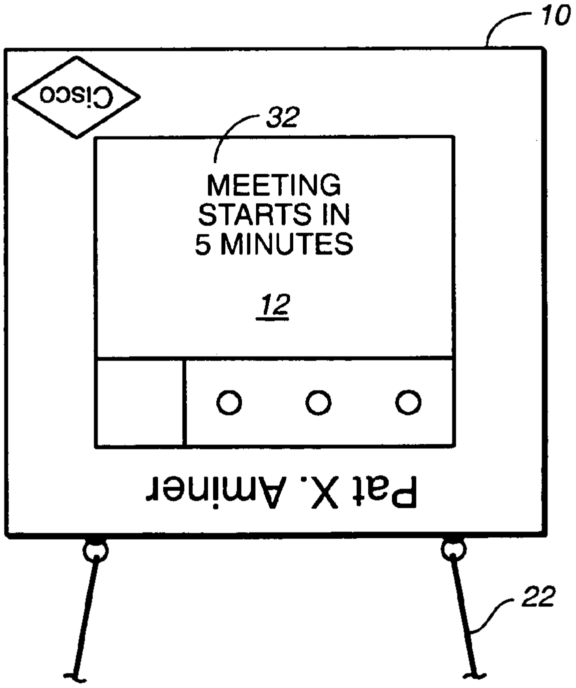
FIG. 4 shows the display unit of the invention in the opposite orientation.

An important feature of the invention is illustrated in FIG. 4. In that figure, the display unit is turned upside down. This is done because the wearer would like to read a message being displayed on her own tag. This mode is called the "menu mode." In FIG. 4, that message 32 is "Meeting starts in 5 minutes." It is seen in FIG. 4 that in spite of the fact that the display unit is upside down (as it would be when raised up by the user while retaining lanyard 22 around her neck), but the text message is right side up. This is because the display unit 10 includes an orientation sensor (not shown) that senses whether the tag is hanging top up, as it is normally worn, or has been inverted, as shown in FIG. 4.

A commercial tilt sensor may be used, such as a GP1S36 tilt sensor from Sharp Electronics in Japan. This sensor is described in the Sharp specification sheet entitled "GP1S36 Photointerrupter for Detecting Tilt Direction." See Appendix C. The emitted signal from the sensor indicating that the tag has been inverted causes the text displayed on the graphical display 12 to become inverted so that it can more easily be read by the wearer. In addition, if desired, the text also can be switched to a smaller text so that longer messages may be displayed to the wearer. Then, when the tag is put back into its normal, hanging position, called the "tag mode," the sensor senses this orientation, and the text mode is re-inverted and, if desired, made larger so it can more easily be viewed by another person standing opposite the wearer. Alternatively, if desired, a user input (from a button, for example) may be used to switch modes.

There are various ways to read the tag in the mode to be read by the wearer. This mode is called the "menu mode." One way is to have a menu set-up, with entries in the menu being ranked in some way. These entries may be placed there before you received your tag at the beginning of the conference, or later by an RFED reader or other wireless communication medium. For example, the item you read last in a menu can remain on the top of the list until you delete that item. Alternatively, the menu can always go back to the top of the list. Typically, the most important thing that you may want to view resides on the top of the menu list. For example, it can be an ordered list of the people you have engaged with at the conference (and thus had their names recorded on your tag). Or the top item can be selected in context sensitive manner, if this selection has been programmed into the tag.

If you are in a talking mode (meeting people, but not passing by RFID readers), one class of items, such as a list of whom you have talked to, can be at the top of your list. On the other hand, if you are passing by an RFID reader, the top item on your list can change to a conference agenda if, for example, you are going to a meeting when you pass by that reader. If the reader is located at an entrance to the exhibitors' booths, the top item in your ordered list can be a list of the booths and their locations. Artificial intelligence can be used to decide what each person should have on the top of his or her own list. The timer can be used in making these decisions (keeping track, for example, of how long it has been since you have interfaced with another person, or how long it has been since you have passed a particular RFID reader).

Another embodiment of the invention is to combine a tag with a PDA. For example, when using the combination unit as a PDA, the IR interface faces out the end of the unit (for example, the part shown in FIG. 3). When using the device as a tag, the IR device faces out the front of the unit as shown in FIG. 1 (element 20). Alternatively, the device can have two IR transmitter-receivers, one on the top and one on the front, and the transmission can be switched from one to the other by using a switch, or by using the orientation sensor described above. Alternatively, mirroring devices or other light switches can be used to switch the IR beam from outputting from one location on the tag to another location.

In addition, the tags can have other mechanisms for communication, such as WiFi receivers, compliant with IEEE 802.11 and any successor standards. These can be used for communication as well. This will allow easy communication to a central website or to a central host computer at the conference. Any other form of radio communication known in the art can also be employed in the tags, provided that interference problems can be overcome.

Tags can have additional information gathering devices beyond the IR and RFID communication media. For example, a tag can contain a GPS locating device, allowing the tag to "know" where each person wearing a tag is presently located. A location detection system that works through triangulation may be used in addition to GPS where GPS does not provide good enough in-building coverage. GPS works better outside than it does inside a building. If that location information is sent through RIFD readers to a central location, and there are enough RFID readers, it becomes easy to locate someone at any time. If you are told that you should find another person, you can enter that person's name in your tag, walk by an RFID reader and get data as to that person's whereabouts at the conference. Similarly, your tag will pass your location to an RFID reader when you pass it. Alternatively, if the tags have radio transmitting capability, your location can be continually broadcast to a central computer. A tag can then interrogate the central computer in the same way and ascertain the location of any other tag wearer. When you have been told that you have something in common with another person at the conference, as will be described later, this will assist you in finding that person. Various rules may be applied to determine who gets access to a person's location information. For example, as a tag wearer, I can make a choice and enter that choice into my tag, indicating (1) that anyone can have my location information; or (2) only people I have "met" (engaged with for a predetermined amount of time) may have it; or (3) only people I have specifically named individually or as a group, for example, only some or all of the event staff.

The tags of the invention can also incorporate communication of the type used in cell phones. In this way, information can be downloaded or uploaded to or from a tag using the telephone system. The tag can also use radio or satellite communication systems such as now commercially used by the "Blackberry" type of hand-held email devices. And, of course, if the tags have both PDA and cell phone capabilities, a wide variety of modes of communication with a tag become possible. SMS, another communication system known in the art, can also be incorporated into the tags.

There are many new methods of this invention that make use of tags described above. These applications are made possible because the tags can combine information. The information to be combined can come from (1) the memory within the wearer's tag; (2) communications transmitted to the tag from an RFID reader, or broadcast wirelessly to all tags or to selected tags; (3) the information in the memory of another tag in IR communication with your tag; or (4) information entered into a tag using buttons 14, 16, and 18. These buttons are merely an example. The tags can have a full keyboard or more buttons, if desired. The three buttons are adapted for short inputs, such as selecting from a menu, scrolling up or down a list, or indicating an action, such as agreement (or disagreement) with a message being displayed on the wearer's tag or on another person's tag standing opposite the wearer. Examples of these new methods of the invention are set forth below.

One use of the tag of the invention is to keep track of people that a wearer meets at a conference. The tag has a built in timer that can be used to time how long two tags are in contact with each other, or to time any other elapsed time or real time. Messages can therefore bear a time code. Elapsed time after a tag wearer has passed a reader can be retained. "Face time"—the time spent talking or interacting with another tag wearer can be measured. The tag may be programmed to require a preset amount of face time during any engagement before it records the name or affiliation of the individual with whom a tag wearer is communicating. This minimum time can be set, for example, to one minute. The tag will then remember each person the wearer has communicated with for at least one minute. That avoids storing data from very brief "hello" types of encounters, or unintentional encounters, such as people you pass in the halls. For each person you spend at least a minute with, his or her name (and any other data, such as affiliation, as programmed into the tag) is passed from his or her tag, to your tag, and vice versa, and kept, for example, as a list in the memory of the respective tags.

When you meet someone, your tag can compare the names of people you have met at the conference with the names of people she has met. If desired, one or both tags can then produce a list of those people the two tag wearers have met in common. If names are not necessary, the tags can display the number of people whom the two wearers have met in common, thus demonstrating whether the two wearers have been mingling in the same circles, or the extent of the overlap between the people one person met compared to another. In addition, one or both tags can display the name of the person that both wearers most recently met in common. The built-in timer can associate the time of each face-to-face contact and produce an ordered list.

A tag can keep track of second order meetings. For example, a tag can display the name of a third person that has met a person you have met. Alternatively, when the wearers come face to face, one wearer's tag can display the names of all people that the wearer has met who have also met that same third person, perhaps a person you are looking for. Either tag can also display the meeting times, or display a list of names that are ordered in order of the times when each of the listed people have met that third person. Each tag also can keep track each time a wearer passes by an RFID reader. That information can also be transmitted to other tags with which the tag communicates, thereby, at least to some extent, enabling someone to locate someone else, as will be discussed further.

The matching can be broadened to include interests, background or other things that two or more people at a conference may have in common. For example, if the hobbies of each conference attendant are programmed into their respective tags, when you approach someone and pass onto her the fact that your hobby is model trains, her badge can indicate if that also is one of her hobbies, or if she has previously engaged (according to the rules of engagement preset within the tag) with another person whose tag also indicated that his hobby was model trains. Then the tag of the person you are talking to can, if desired, list the name of that other person and the time that the person with whom you are presently engaged met the third person with the model train hobby (and, if desired, also the elapsed time since that person met the third person with the train hobby).

The tags not only can match any item on the profile of the person with whom you are presently engaged, but also of people that that person has met. If you meet someone with nothing in common with you, her tag can be programmed to display a message: "We have little in common, but you should talk to Sally." And the message can further state: "I talked to Sally 4 minutes ago." Then you would likely ask this person where she was four minutes ago, so you can go there in search of Sally. If the tags have GPS capability, the tags will also be able to display the last known location in the room of the person who you are seeking that had a matching personal characteristic. Even without GPS, tags can contain information that tells when a person last passed an RFID reader, providing some hint as to where that person may be when you are looking for him.

Tags can make calculations about people based on the number of face-to-face interactions they have. For example, a tag can calculate and display whether you are a mingler or a social dud based upon how many people you have engaged with.

Most information using the tags of the invention is conveyed by looking at someone else's tag, not your own. This is different from prior art PDAs, for example, where you primarily will get information by looking at your own PDA, not another person's PDA. However, you can also look at your own tag, for example, if conference information is being broadcast to all the tags.

It is important that the tags of the invention are worn so they can electronically communicate with other tags without user intervention. This is different from a PDA, where communication only takes place deliberately. With a PDA, the user takes the unit out of his pocket and aims it at another person's PDA to transmit information. There is no mode with a PDA whereby it always is in a mode to transmit to any other PDA in range. Laptop computers often automatically set up a communication path with another computer in range, but no actual communication takes place without user intervention. The fact that the tag of this invention hangs on your neck, or is otherwise worn in a manner that is always on and ready to communicate with another tag, insures at least some communication without user intervention.

The extent of unsolicited communication between tags can be user-designed. For example, when two tags come face to face, they may automatically exchange names, or names and corporate associations, but not more. User intervention may be required, such as a press of a button 14, 16, or 18, to transmit additional information, such as a business card, from one tag to another.

A very important application of the tags of the invention at a conference is to get conversation going. One way to do this is to assign each person a "secret partner." When, you meet any other person, the other person's tag will say "I'm your secret partner" or, if she is not, then it might say "I met your secret partner 10 minutes ago," or "I met someone 5 minutes ago who met your secret partner 3 minutes before I met him." This leads you to ask: "Who did you talk to 5 minutes ago?" Or the person you are talking to could introduce you to the person she met 5minutes ago.

To get these discussions going, the conference planner can give each person the name of a few people that the person is supposed to meet. When you meet one of those people, your tag can delete that name from the list. Then the next person you are to meet comes up on the tag. Either you or the conference planner can choose the order of importance of the three people you are supposed to meet. Each person you meet can display on her tag automatically (1) whether she has already met one of your assigned people; and/or (2) whether she has met someone who has met one of your people, and, if desired, who that person is.

Another method of the invention using the tags is an entrance poll. Thirty minutes before an event, for example, your tag will flash its light to signal the user that it has a message (or sound a beep, or any other method to alert the user, such as vibration of the tag). The timer on the tag can be used to "pop the question" a preset amount of time before a speech, for example. At the appointed time, the tag will flash or sound and will display a message saying that you should answer the following question: "What is the biggest danger for your company?" Then your tag displays multiple answers, such as "(1) War in the Middle East" or "(2) The fact that your CEO is overpaid." Or "(3) Competition from Microsoft." This information and questions have been downloaded to your tag when you passed an RFID reader as you entered the room, or could have been pre-stored in the tag when the tag was handed out, or entered in any of the other ways described earlier.

You answer the question by using the buttons 14 or 16 to scroll up and down the list, and button 18 to select your choice. If you have done this before you entered the room, your answer can be read by an RFID reader as you enter the room. The results from all tag wearers in the room are tabulated by a central computer, and can be made available before the speech to the CEO who is speaking, enabling the CEO to say: "It is apparent that my excessive salary represents a problem to all of you, as 74% of you selected that as our biggest problem!" She can then focus on that issue in her talk.

Moreover, before or after the talk, when you meet someone, you can compare your answers to these questions. If you both answered the same, you have something to talk about. The tags will communicate, and if so programmed, will display whether you answered the question the same or not. If you gave different answers, each tag can display the answer given by the other person with whom you are talking, telling him how you answered the question, and vice versa. This also will provide fuel for a conversation.

In addition each the tag may record the time of the meeting and the names of the two people who are talking. When you go by a reader, not only is the answer to the question, which you selected, read by the reader, but it may also read the names of everyone you talked to, either up to that point in time, or between any prescribed points in time. In that way, the meeting planner can maintain a central database of who has met whom (provided the respective tag wearers have walked by a reader after an encounter).

Yet another application is gather information after a speech. The tag can be timed to flash and ask you what you thought of the speech. You can respond to multiple choices, for example, using a Likert scale, using the buttons on your tag, and your answer is then collected on your way out of the room (by the RFID reader).

Another important application of the tags is to establish common ground among the attendees at a meeting. For example, before you begin inter-tag communication, you can answer a question using your tag. If the meeting is in Las Vegas, the question can be: "What show in Vegas would you most like to see?" There can follow any number of multiple choices, which you scroll and pick. When two people meet, the tags can display the name of the chosen show for each person, or whether it is the same show, or both. Moreover, a tag wearer can be a broker between two other people. If the two of you did not choose the same show, the tag can display: "I didn't choose Cirque de Soleil, but I met someone two minutes ago who did choose that show." Then the other person can try to find that person by asking the person he is now talking to for the name of the person she met two minutes ago.

The same kind of exchange works for interests or hobbies. If attendees, when they register for the conference (or later after they arrive), enter into their own tag their main hobby, that can be used in the same manner described above. When you approach someone, the tag may search through all the data commonly entered in everyone's tags. Then, if a match is found, the tag of the person you are talking to can display; "Hey! We both like model trains." Or "We are both from Eau Claire, Wis.," or "I see you like model trains. I met someone 4 minutes ago who also likes model trains." These displays will get conversation flowing.

Another method of the invention is to have the tags play the role of a host. A cocktail party host meets a guest, and takes her over to another guest and says "You two are both in the investment business." Then the host disappears and the two people can talk shop. The tags can perform this function. A tag does this social function without user interaction. When you meet another person at a gathering, the tags talk before you do. They search the data stored on each tag and try to figure out what you have in common with that person, if anything. It might be a hobby, an interest, for example a popular book you have both read or a movie you have both seen, where you live, work, what sport you enjoy doing (or watching), etc. The common thing is displayed on the mutual tags. And if there is none, the other person's tag could say: "I'm not from Eau Claire, but I met someone 15 minutes ago who was." Particularly if the place is not common, or the hobby or interest is uncommon, the person being informed of the prior meeting will surely try to find that person.

If the tags have GPS receivers, it makes it much easier to find the person you would like to talk to, as wearer's locations would be sent to a central host through RFID, or if available on the tag, through WiFi or other radio communication, such as Bluetooth. GPS does not add a lot if RFID is used, as merely passing by an RFID reader already indicates your whereabouts. However, if a longer range radio is on board the tags, each wearer's whereabouts can be sent continually to a central database, which can be available to the tags through their radio receivers.

If GPS is on the tag, the tags can be used to provide a list of everyone within a certain number feet of the wearer of a tag (or within a certain number of feet of the person with whom she is talking). In a preferred embodiment, this can be accomplished through tag-to-tag proximity detection using an active radio system or range finder on the tag. Such a system is already in use in a system called "SpotMe." Unlike the invention, however, the SpotMe device is not a wearable device, but instead, operates like a PDA, and must be removed from the user's pocket for each desired interaction.

The names of the nearby people can appear on your tag or on the other person's tag. Or, you can enter a name and ask if that person is within a selected number of feet of you. You also can ask the tag to tell you if that person ever does come within 25 feet of you. When that happens, your tag can notify you by a light, beep or other method described earlier. The GPS information can also tell you in which direction to walk. The tag of the person you are facing can say: "Bob likes model trains, and is located 42 feet NW of you." All this is done by a tag using its computation powers to compare information it contains, has received from another tag, or in any other manner.

Another method of the invention is using the tags for a "people treasure hunt." For example, each person needs to find three others who are from Chicago. Or, you need to find one person who is from Chicago and likes broccoli. The data is most likely fed into the tag before the conference, as described earlier. Then, by communicating with various people, you narrow down your search, as described earlier, when the person you are talking to displays a message: "I'm not from Chicago, but I met someone two minutes ago who was." These clues allow you to find your "treasure" (the person from Chicago who likes broccoli).

In addition to facilitating social interaction, the tags can also be used for event management. They can keep track of which people attended which speeches, or the amount and type of interaction between people at the event. The tags can keep track, through the RFID readers at the entrances to rooms, who went where. If there are booths to be visited, each booth can have an RFID reader that will keep track of attendees. Since people may want to keep their detailed information confidential except when they wish to share it, the tags can be programmed only to automatically transmit only the persons name, or name and affiliation. If a person wants to share his business card (with email address, for example), the tag wearer can be required to press one of the buttons, and then that additional information will be transmitted.

The RFID reader at a booth can also supply information to a tag wearer, if desired by the wearer. By pushing a different button, for example, the tag can receive data about the company sponsoring the booth, or about its products. Alternatively, the staff at the booth can wear a tag, thereby capturing the business cards of everyone visiting the booth that consents to transmit his card information. The booth manager can gather information about the booth staffers from their tags, thereby ascertaining which staffers are most effective at meeting people and thereby getting them to share the more detailed business card type of data.

The attendee can use her own tag to indicate to a booth staffer's tag a request for follow-up product information (by pushing a button on the attendee's tag). Your own tag keeps a list of booths visited. Therefore, if desired, you do not need to directly tell the booth staffer your business card information. You can keep an automatic list of booths visited, and later use the tag to select the ones to whom you wish to send your card, or to send a request for further information from that booth. When your tag gets turned in at the end of the conference, the data is collated and sent to each selected booth operator. Alternatively, as discussed above, that data can be scanned off your tag by an RFID reader during the event. The data may also be made available to attendees through a website after it has been scanned off the tags, so that an attendee who realizes long after an event that she should have asked for follow-up information can easily do so.

The tags can be used as "automatic" PDAs, and provide business card exchange when any two people meet. This can be programmed to be automatic, or require the push of a button, as discussed earlier. With the wearable tags of the invention, as opposed to PDAs, the interface is always present, whereas with a PDA, you have to take it out of your pocket first.

The tags provide many levels of information exchange. The first level is automatic. When you face someone who is also wearing a tag, your name (and perhaps your affiliation) appears on your tag for the other person to see. This is analogous to a simple name tag. When two people come up to each other, a message is shown with no time lapse, such as "We both like broccoli." The next level is consensual communication, where you hit a button to pass a business card to another tag. Another level is to use the tag to help remember people whom you have met (this is public, and not confidential information). To avoid meaningless lists, a timer is set, and only after 1 minute of IR interchange time, is the information, such as name and affiliation, recorded onto your tag and onto the other person's tag. This avoids collecting meaningless lists of people you passed in the hall, but did not meet. (Presumably you can get a list of all attendees from the conference administrator.) The tag can also use its timer to provide a time stamp of the time that each recorded meeting took place.

At the end of the event, you can get an email from the person administering the tags, who has read the data from your tag after the event. This email may contain, for example, two lists. The first will contain the people you have met (but with whom you did not do the full data exchange). That list will only have the person's name and affiliation. The other list contains the people with whom you did do the full data exchange, and will contain everything about those people that was selected for interchange.

Other useful information can be collected from the tags and distributed to attendees. For example, each person can receive data on the number of people that person met at the conference, along with the average number of people that each person at the conference met. If desired, this information can be computed and placed into the tags using the techniques described earlier, thus enabling two people, who are conversing, to be able to see on each other's tag how many people that person met at the conference, and also the number they met in common (including the names if that is useful). Data can also be kept (and/or displayed on the tags) on how many people one person met that another person has not yet met.

By compiling and distributing statistics, it can be determined whether a person is a relative introvert or extrovert (by comparing the number of people the tag wearer met to the average number met by each attendee). Thus, the relative size of the attendees' social networks can be computed and compared (e.g. you're connected to 100 people, but I'm only connected to 50). This provides feedback to the attendees on how well each one is connected to the social network at the event, and how their networking statistics compare to others.

The last level of communication is used to indicate interest in follow-up. When you are talking to a person, you, hit a different button (from the button used to approve full data interchange), and it flags that person for follow up. Then, after the conference, you get three lists: (1) the people you talked to; (2) the people you exchanged "cards" with; and (3) the people you intend, for some reason, to follow up with. If desired, there can be only two lists, with the follow up candidates asterisked. If you want, you can have an "urgent follow up" category, for example, by pressing the "follow-up" button twice. These features can be used when you visit a booth as well, either by the passerby or by the booth staff who are also wearing tags. The event planners can provide the same type of lists for the booth staffers. One example of consensual transmission is to flip up the tag, push a button, and the tag puts a check mark next to the name of the person you're talking to, indicating that you want to send your full contact information, such as email, phone, cell phone number, or whatever you choose in advance to send.

Radio or RFID signaling, using a strong signal from a central reader to one or to multiple tags, can be used to broadcast messages to everyone. Particularly if no response is required, RFID can cover a broad area. Such a message can say that a speech is starting in 10 minutes, or has been delayed for 15 minutes, or that there is a fax waiting at the reception. Since the fax is individual to one tag, it may be sent with the wearer's tag ID, so only that wearer's tag will pick it up. The tags may be programmed to be selective, if desired, and only store messages directed to all tags, or only to that particular tag, but not messages directed to other tags. This broadcast feature can be used to broadcast event agendas, speaker biographies, lists of exhibitors or other commonly useful information.

The RFID-tag communication can record, in a central database, who has entered a room, who has left the room, and using that information, keep track of who is in the room, who attended a particular speech or visited a booth, who attended various meeting sessions and who did not. For example, professionals, such as doctors or lawyers, may only get credit "continuing education" credit for the conference if they attend certain speeches. The tags can be used to furnish the conference administrator with all that information, which can be relayed to the State Bar or Medical Board. Many conferences now employ auditors to provide independent verification of attendance to sponsors and exhibitors. The attendance data gathered by the tags will avoid the necessity of having such auditors.

Furthermore, there may be areas that only certain, pre-selected attendees may enter. When a person enters this area, an RFID reader can detect, from the person's tag, whether he is qualified to enter. If not, a buzzer can sound, or a person at the door can receive a signal indicating that the person entering is not qualified to do so. The person at door can then ask "Do you have ID?" A person that is not qualified may be refused entrance. Using this mode of operation, the tags can be used to store and transmit "digital tickets" to areas and events. These tickets can carry rules as to how they may be passed from one person to another. For an open party, tickets may replicate as they are passed from one person to another, leaving a ticket with the second person.

The amount of replication can be controlled, for example, if attendance is limited. One tag may only be able to provide three tickets, for example. After that, it is not possible to pass more tickets. The tickets may be passed automatically, or only if the tag wearer indicates a desire to invite the person he is talking with (in the same manner, as described above, the full business card information is passed on). For strictly limited attendance, a ticket can only be passed, not replicated, so that it cannot be passed further by the recipient. And there may be rules as to the profile of those to whom tickets can be given (e.g., only to "gold level" partners, as discussed above). These tickets can be linked in to the security mechanism described above.

Another method of using the tags is in conjunction with personalized message boards. When you walk by a sign or advertisement, the sign automatically reads your tag (using any of the available methods of communication on your tag) and displays a personalized message. For example, at a conference, the dynamic message board can display: "The conference you signed up for starts in 5 minutes." Or, if you pre-registered for the conference, and answered "Toshiba" to the question of what laptop computer do you own, the board can display an advertisement for a WiFi adapter specifically designed for your Toshiba laptop. This would happen automatically as your tag came into communicating range (for example, IR or RFID) of the board. Or, the board can display a phone message for you.

Since the preferred embodiment of the tags of this invention have both RFID and IR communication, the message board can attempt to read both signals. If only the RFID signal was received by the board, and not the RF signal, the board would "know" you were not close enough for IR communication but were close enough for RFID communication, and can display your message in larger print so it can be read from afar. That could be a short message, such as "You have a phone call." As you get closer to the board, when IR communication is detected by the board, the print can become smaller and the message therefore can be more detailed, such as "Please call your mother on her cell phone at (999) 222-3454."

Since these tags are reusable, it is important that they be returned at the end of the conference or gathering. To be sure to get a tag returned, it is possible to display a notice on the tag timed with the tag's timer to flash or beep one-half hour before the event ends, for example, and display a message to return the tag. To enforce tag return, attendees can be notified (by the tag or otherwise) that they will not get an email with all their desired contact information unless the tag is returned. The RFID readers at the doors can also be connected to provide an alarm (such as is used to prevent shoplifting) if a person leaves the meeting area with her tag in her possession.

There are many other embodiments of the tag and the methods of communication using a tag of this invention that will be readily apparent to those skilled in the art. Therefore, the invention should only be limited as set forth in the claims which follow.

What is claimed is:

1. A wearable electronic display unit to be worn by a first person, comprising:

a display capable of displaying text in a first display mode adapted for viewing at a distance by a second person, and in a second display mode adapted for being read nearby by the first person, the display having access to stored identifications of people who were within the first person's social network prior to a receipt or an activation of the display unit by the first person;

when the display is operating in the second mode, the text being oriented in one orientation relative to vertical, and when the display is operating in the first mode, the text being larger than the text when the display is operating in the second mode and the text being oriented in a different orientation relative to vertical, the wearable electronic display unit having the capability to (1) add, to the stored identifications, an identification of the second person as being within the first person's social network; and (2) receive stored identifications of people who are within the second person's social network," further including an interface.

2. The wearable electronic display unit of claim 1 wherein the information transmitting and receiving interface comprises an infrared tranceiver.

3. The wearable electronic display unit of claim 1 wherein the sensor also detects whether a display is oriented substantially in the first orientation relative to vertical, or substantially in a second vertical orientation relative to vertical, and provides an electronic signal to indicate the orientation, whereby, in response to the electronic signal from the sensor indicating that the display is oriented substantially in the first orientation, the display displays text in the first mode, and in response to a signal from the sensor that the display is oriented in an orientation opposite to the first orientation, the display displays text in the second mode.

4. A wearable electronic display unit to be worn by a first person, comprising:

a display capable of displaying text and graphics in a first display mode adapted for viewing at a distance by a second person, and in a second display mode adapted for being read nearby by the first person, the display having access to stored identifications of people who were within the first person's social network prior to a receipt or an activation of the display unit by the first person, and when the display is operating in the first mode, the text has one orientation relative to vertical, and is larger than the text when the display is operating in the second mode and when the display is operating in the second mode, the text has a different orientation relative to vertical; and an information transmitting and receiving interface located on the display so that, when the interface faces in a direction of a short-range substantially unidirectional communication, electronic communication is possible between the display unit and a second display unit worn by a second person, the display unit having the capability to (1) add, to the stored identifications, an identification of the second person as being within the first person's social network, (2) receive stored identifications of people who are within the second person's social network, (3) without wearer intervention, analyze the social network of the first person and the social network of the second person, and (4) display a measure expressing a result of the analysis of the social network of the first person and the social network of the second person.

5. The wearable electronic display unit of claim 4 further comprising a sensor that detects a first orientation of the display relative to vertical and provides an electronic signal to indicate the first orientation.

6. The electronic display wearable electronic display unit of claim 5 wherein the sensor that also detects whether the display is oriented substantially in the first orientation relative to vertical, or substantially in a second vertical orientation relative to vertical, and provides an electronic signal to indicate the orientation, whereby, in response to the electronic signal from the sensor indicating that the display is oriented substantially in the first orientation, the display displays text and graphics in the first mode, and in response to a signal from the sensor that the display is oriented in an opposite orientation opposite to the first orientation, the display displays text and graphics in the second mode.

7. A wearable electronic display unit to be worn by a first person, comprising:

a display capable of displaying text and graphics in a first display mode adapted for viewing at a distance by a second person, and in a second display mode adapted for being read nearby by the first person, the display having access to stored identifications of people who were within the first person's social network prior to a receipt or an activation of the display unit by the first person, and when the display is operating in the first mode, the text is larger than and is in a different orientation to vertical than the text when the display is operating in the second mode; and an information transmitting and receiving interface located on the display so that, when the interface faces in a direction of a short-range substantially unidirectional communication, electronic communication is possible between the display unit and a second display unit worn by a second person, the display unit having the capability to (1) add, to the stored identifications, an identification of the second person as being within the first person's social network, (2) receive stored identifications of people who are within the second person's social network, (3) without wearer intervention, analyze the social network of the first person and the social network of the second person, and (4) display a measure expressing a result of the analysis of the social network of the first person and the social network of the second person.

8. The wearable electronic display unit of claim 7 further comprising a sensor that detects a first orientation of the display relative to vertical and provides an electronic signal to indicate the first orientation.

9. The wearable electronic display unit of claim 8 wherein the sensor that also detects whether the display is oriented substantially in the first orientation relative to vertical, or substantially in a second vertical orientation relative to vertical, and provides an electronic signal to indicate the orientation, whereby, in response to the electronic signal from the sensor indicating that the display is oriented substantially in the first orientation, the display displays text and graphics in the first mode, and in response to a signal from the sensor that the display is oriented in an opposite orientation opposite to the first orientation, the display displays text and graphics in the second mode.

* * * * *

UNITED STATES PATENT AND TRADEMARK OFFICE

CERTIFICATE OF CORRECTION

PATENT NO. : 7,688,211 B2
APPLICATION NO. : 10/729696
DATED : March 30, 2010
INVENTOR(S) : Richard D. Borovoy et al.

It is certified that error appears in the above-identified patent and that said Letters Patent is hereby corrected as shown below:

Column 16, Lines 26-27: In claim 1, delete "network," further including an interface." and insert -- network. --

Column 16, Line 28: In claim 2, after "claim 1" insert -- further including an interface --

Column 16, Line 29: In claim 2, after "the" delete "information transmitting and receiving"

Column 16, Line 30: In claim 2, delete "tranceiver." and insert -- transceiver. --

Column 16, Line 53: In claim 4, delete "vertical," and insert -- vertical --

Column 16, Line 54: In claim 4, after "mode" insert -- , --

Signed and Sealed this

Twenty-fifth Day of May, 2010

David J. Kappos

*Director of the United States Patent and Trademark Office*